Nov. 3, 1931.  H. W. COOPER  1,830,522
MACHINE FOR MAKING COMPOSITE SHEETS
Original Filed Nov. 3, 1927   2 Sheets-Sheet 1
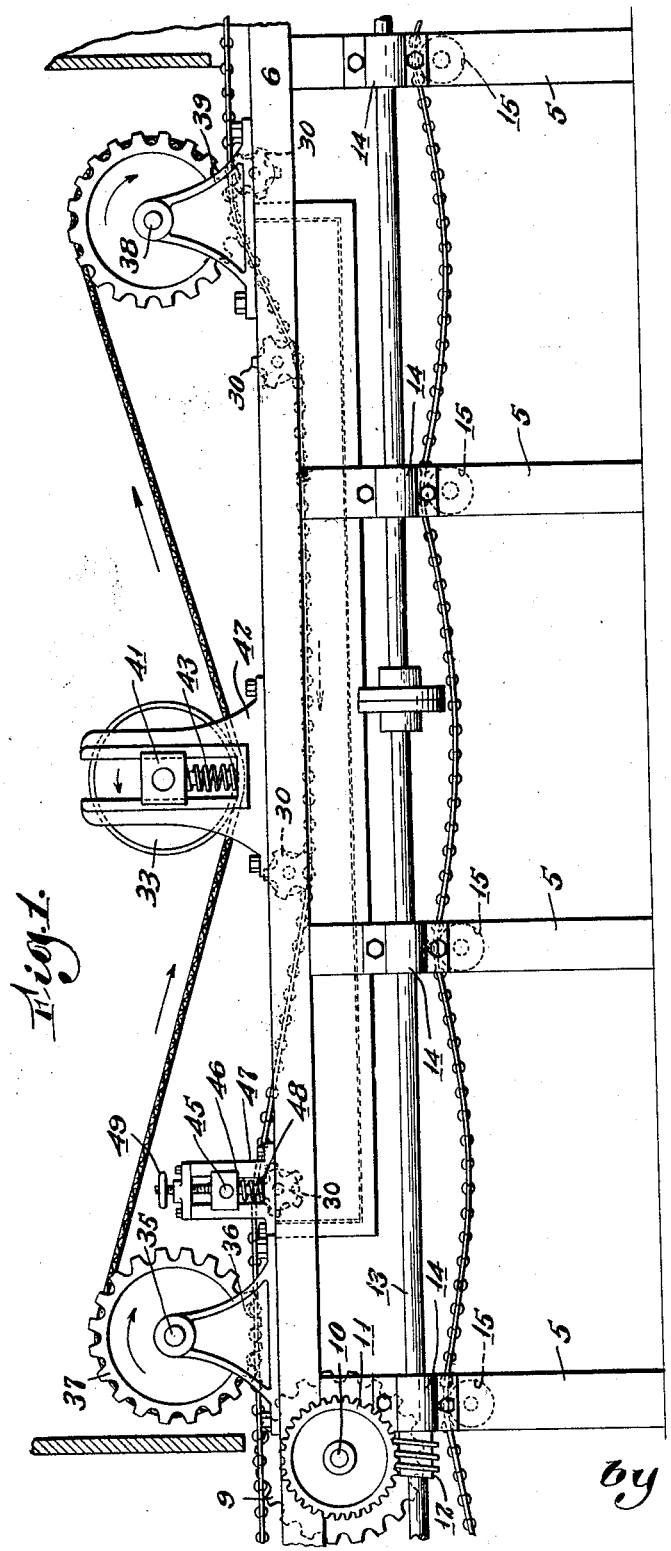
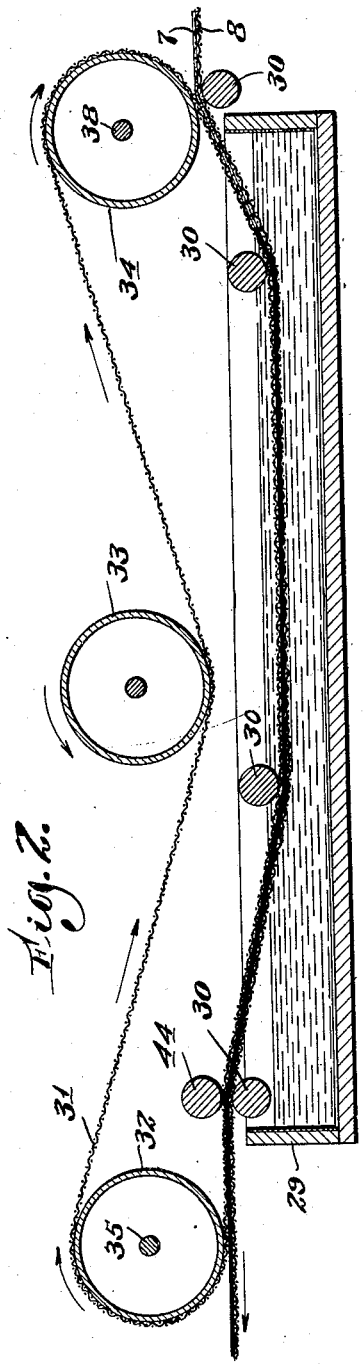
Inventor
Henry W. Cooper
by Warren G. Ogden
his Attorney

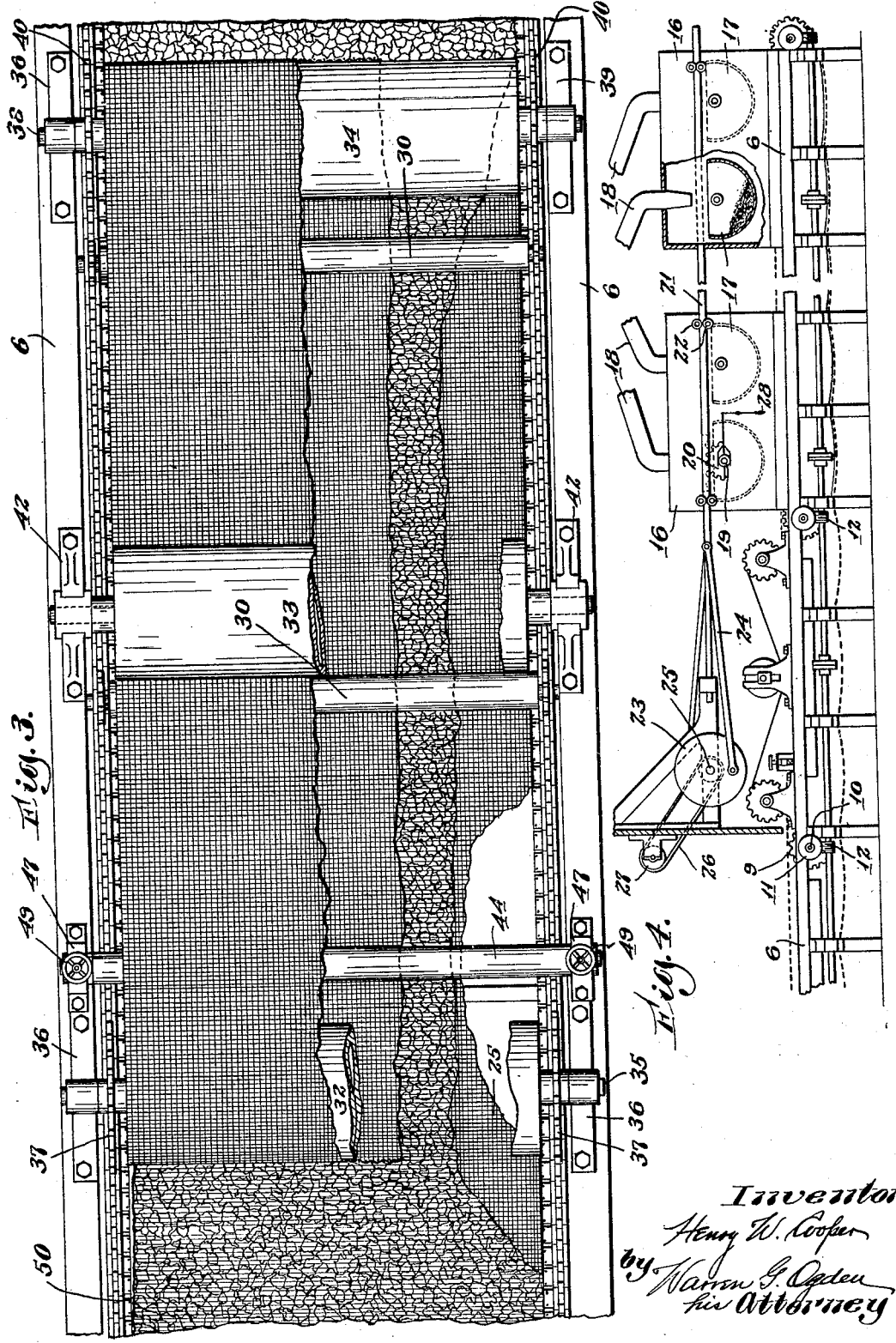

Patented Nov. 3, 1931

1,830,522

UNITED STATES PATENT OFFICE

HENRY W. COOPER, OF WEST NEWTON, MASSACHUSETTS, ASSIGNOR TO NEW ENGLAND MICA CO., OF WALTHAM, MASSACHUSETTS, A CORPORATION OF MASSACHUSETTS

MACHINE FOR MAKING COMPOSITE SHEETS

Original application filed November 3, 1927, Serial No. 230,892. Divided and this application filed August 15, 1929. Serial No. 386,052.

The present invention relates to machines for making composite sheets and more particularly to machines for making composite sheets of mica used in insulating electrical apparatus.

In accordance with the method disclosed in the application filed by me November 3, 1927, Serial No. 230,892, from which this application is a division, a composite sheet is formed by assembling its component parts, the mica flakes, in a dry condition, and then the complete loose assembly of the required thickness is drenched with an adhesive while the component parts of the assembled sheet are retained against displacement.

The principal object of the present invention is to produce a machine for practising the steps of my novel method.

To the accomplishment of this object a feature of the present invention contemplates the provision, in a machine for making composite mica sheets, of means for forming a complete, preferably dry, loose assembly of mica flakes to the required thickness, means for drenching the assembly with an adhesive and means for retaining the component parts of the assembled sheet from displacement while it is being drenched.

Broadly considered the means for forming a complete loose assembly of the component parts to the required thickness, the means for drenching the assembly with an adhesive, and the means for retaining the component parts of the assembled sheet from displacement while it is being drenched may take any selected form. It is preferred, however, to form the complete, loose assembly of mica flakes to the required thickness by showering the flakes in layers upon a movable surface, such as a conveyor, to drench the assembly with an adhesive by dipping the conveyor with the assembly of flakes thereon in a bath of liquid adhesive, and to retain the assembly from displacement during dipping by an apron which covers the assembly and presses it yieldingly against the conveyor. The term "dipping" is used herein to include the immersion of the assembled sheet in the bath of adhesive and the withdrawal of the assembled sheet therefrom. During that part of the operation of the dipping means in which the assembly of flakes is withdrawn from the bath of liquid adhesive and while the component parts of the assembly are held from displacement, the machine preferably is provided also with means for subjecting the adhesive-permeated assembly of mica flakes to a solidifying pressure to form it into an integral sheet.

Further features of the present invention consist in certain devices, combinations and arrangements of parts tending to improve and simplify the operation of machines for making composite sheets and enable them to operate with certainty and without liability of breakage of parts. The advantage of these devices, combinations and arrangements of parts will be obvious to those skilled in the art from the following description.

The various features of the present invention will be readily understood from an inspection of the accompanying drawings illustrating the best form of the invention at present known to the inventor, in which:

Figure 1 is a view, in side elevation, of the portion of the machine for making composite sheets in which the component parts of the assembled sheet are drenched with an adhesive and solidified into an integral sheet;

Fig. 2 is a view, in sectional elevation, of the portion of the machine illustrated in Fig. 1;

Fig. 3 is a view, in plan, of the same portion of the machine; and

Fig. 4 is a view, in side elevation and on a reduced scale, showing more or less diagrammatically the entire machine up to the inspection table.

In the illustrated embodiment of the invention the machine for making composite mica sheets comprises an elongated frame upon which the successively operating mechanisms are assembled. These comprise an endless conveyor extending the full length of the frame, bins and sifting mechanism located at one end of the frame for showering successive layers of mica flakes upon the conveyor while it is travelling beneath the bins, mechanism for dipping the conveyor together with the mica flakes thereon into a tank of liquid adhesive, mechanism for compressing and compacting the adhesive-permeated layers of mica flakes into an integral sheet, and an apron, which is applied to the mica flakes on the conveyor before the dipping operation and which is removed from the mica flakes after the compressing and compacting operation, for retaining the dry mica flakes from displacement on the conveyor while the assembly is being dipped and compacted.

The main frame of the machine, of considerable length, is built up of pairs of angle iron posts or legs 5 (Fig. 1) connected by cross bars, not shown, and by long horizontal side bars 6. The conveyor 7 is made up of a pair of spaced sprocket chains to which are connected the edges of a web of foraminous material, preferably a wire mesh cloth 8 having about four meshes to the inch. The chains of the conveyor 7 are supported and driven by a series of sprocket wheels 9 (Fig. 1) carried by transverse shafts 10 journaled in the main frame of the machine and each carrying a worm wheel 11, meshing with a worm 12 mounted upon a shaft 13 extending longitudinally for the whole length of the frame and journaled in boxes 14 carried by the legs 5 thereof. The shaft 13 is driven from any convenient source of power, not shown, and acts to drive all of the sprocket wheels 9 in a counter clockwise direction, so as to advance the upper pass of the conveyor 7 from right to left, as seen in the drawings. The lower pass of the conveyor is supported by idle rolls 15 journaled between each pair of legs 5.

At the right-hand end of the frame and above the conveyor is located a number of bins 16, two of which only are shown in Fig. 4. Each of the bins contains two oscillating cradles 17 with perforated walls of expanded metal, having openings of appropriate dimensions and adapted in their oscillation to sift out and shower mica flakes upon the conveyor passing beneath them. The flakes are supplied in bulk to these cradles through suitable ducts 18 extending into the bins 16 from a source of supply, not shown. Each of the cradles is carried by a transverse shaft 19, having a toothed segment 20 at one end, meshing with a horizontally disposed reciprocating rack 21 guided by spaced pairs of rollers 22 and actuated from a crank disk 23 through a connecting rod 24. The crank disk is carried by a transverse shaft 25, driven by a belt 26 from a motor 27 or other convenient source of power. Clutch mechanism, controlled by a handle 28 (Fig. 4) is provided for throwing each cradle into or out of operation in accordance with the requirements of the work in hand.

The mechanism above described is indicated in Fig 4 diagrammatically rather than structurally but it will be apparent that the conveyor, in traveling toward the left beneath the bins 16, accumulates a layer of mica flakes from the first bin which is increased in thickness as it progresses into the range of the showers from each successive pair of cradles 17. On account of the foraminous nature of the conveyor, dust and flakes of insufficient size for the required purpose are sifted out of the lower layer of the flakes, so that only flakes larger than the mesh of the conveyor are carried away from the first bin. The number of the cradles and their rate of supply is so controlled that the layer of flakes, as it passes from the left-hand bin of the series, is built up to the required thickness and constitutes a loose, dry assembly of material just prior to the operation of binding the flakes to produce an integral composite mica sheet.

Figs. 1, 2 and 3 illustrate in somewhat greater structural detail that portion of the machine wherein adhesive is supplied to the layer of flakes assembled on the conveyor in the manner above set forth. The main frame of the machine carries an elongated tank 29, located to the left of the last bin 16 of the series and in such position that the conveyor 7 can be deflected into the adhesive which the tank contains, this conveniently being shellac. To this end, guide rollers 30 are provided which lead the conveyor 7 to the wall of the tank 29, then deflect it downwardly below the surface of the shellac and finally guide it back into its original path as it leaves the tank. The rollers 30 are journaled in the side bars 6 and are provided with sprocket wheels at each end which mesh with the chains of the conveyor 7 so that the rollers are driven at the same surface speed as the conveyor.

In order to prevent displacement or floating away of the mica flakes as these are carried into the shellac by the conveyor 7, provision is made for engaging the top layer of the showered flakes thus holding all the layers in place upon the web 8 of the conveyor. This is effected by an endless apron of wire mesh cloth 31, which is guided into engagement with the surface layer of mica flakes on the web 8 as the latter enters the tank 29. For this purpose, a series of three drums 32, 33 and 34 is provided for driving and guiding the apron 31 in the desired path. The drum 32 is carried by a transverse shaft 35, journaled in suitable shaft hangers 36 (Figs. 1 and 3) bolted to the side rails 6 of the frame and carrying sprocket wheels 37 at its outer ends which mesh with and are driven by the sprocket chains of the conveyor 7. The drum 34 is similarly mounted upon a shaft 38, journaled in hangers 39, and is similarly driven by the conveyor chains through the sprocket wheels 40. The drum 34 serves to guide the apron 31 into contact with the conveyor, automatically and progressively covering the loose assembly of flakes thereon.

The center drum 33 is an idle roll and is constructed and arranged to maintain suitable yielding tension upon the apron 31. To this end, it is journaled in sliding boxes 41 (Fig. 1) mounted for vertical movement in slotted hangers 42, secured to the rail 6, and having its weight compensated to some extent by compression springs 43 disposed beneath the boxes.

The apron 31 is maintained in contact with the conveyor 7 throughout the course of its travel in the shellac bath and until after it has emerged therefrom. The roller 30, located at the left end of the tank 29, co-operates with a presser roller 44 for pressing, compacting and solidifying the sheets of cohered layers of mica flakes as it is carried out of the shellac bath between the conveyor 7 and the apron 31 and these rolls also serve for stripping surplus shellac from the sheet, so that it may be returned to the tank. The roller 44 is carried by a shaft 45 journaled in boxes 46 mounted in a pair of slotted hangers 47, secured to the side rails 6 of the frame. Each box is urged upwardly by a compression spring 48 located beneath it but may be moved downwardly to exert a predetermined but controllable amount of pressure upon the layer of mica by a hand screw 49 provided for that purpose.

As the solidified and now unified composite mica sheet is carried beyond the drum 32, the apron 31 is stripped from it and the sheet is carried forward, exposed upon the conveyor 7 where it may be conveniently inspected and eventually cut into smaller sheets of commercial sizes.

In my co-pending application Serial No. 230,891 filed of even date with the parent case of which this application is a division I have shown a complete mica plate laying machine, including a light table for inspection and rectification of the sheet, of the same general design as is partially illustrated by Fig. 4 of this application but differing therefrom in that means is provided for applying adhesive binder to each layer of the mica flakes as they are successively showered upon the conveyor. The herein illustrated mechanisms may be substituted in the machine of my co-pending application for the mechanisms employed for effecting said step-by-step application of the binder with a saving of the binder and an increased dielectric strength in the finished plate. Accordingly generic claims to the complete machine and method of manufacture will be found in my co-pending application Serial No. 230,891, the claims of this application being confined to the alternative mechanism for supplying the binder.

The nature and scope of the invention having been indicated and its preferred embodiment having been specifically described, what is claimed as new, is:—

1. A machine for making endless sheets of composite mica having, in combination, a conveyer for receiving an assembly of dry mica flakes of the desired thickness upon its upper pass, means for advancing said conveyer at a predetermined rate of speed, a tank of liquid adhesive, means for directing the upper pass of said conveyer with its assembly of dry mica flakes into the adhesive and then out again, an endless covering apron above the tank supported and guided to cause its lower pass to engage the mica flakes on that portion of the upper pass of the conveyer that is travelling through the adhesive, and driving means for the covering apron actuated by engagement with the conveyer thus continuously to maintain uniformity of advance throughout their combined travel through the tank and to hold the component parts of the loose mica flake assembly from displacement.

2. A machine for making endless sheets of composite mica according to claim 1 having a sprocket chain at each edge of the conveyer, sprockets engaging in said chains to advance the conveyer, rotary drums for supporting and guiding the covering apron, and sprockets on said drums of the same size as the first named sprockets also engaging in said chains whereby the covering apron is advanced at the precise rate of speed of the conveyer.

3. A machine for making endless sheets of composite mica having, in combination, an endless conveyer having the greater portion of its upper pass guided in a definite path, means for advancing said conveyer, means at separated stations for showering successive layers of dry mica flakes upon said moving upper pass to build up a loose dry assembly of the desired thickness, a tank of liquid adhesive relatively short as compared to the length of the conveyer and disposed intermediate its ends, means for deflecting the conveyer with its loose assembly of mica flakes out of its path and into the adhesive and then to pass onward, and a moving covering apron acting to engage the assembly of flakes and hold them against displacement while being dipped and then disengage from the cohered flakes as the conveyer carries the unified composite mica sheet onward.

4. A machine for making endless sheets of composite mica having, in combination, a conveyer for a loose, dry assembly of mica flakes, a tank of liquid adhesive, an endless apron over the tank, common means for deflecting the upper pass of the conveyer and the lower pass of the apron into the adhesive permitting the adhesive to permeate the theretofore dry assembly of flakes held therebetween, and means for maintaining a yielding tension on the apron by weighting its upper pass.

5. A machine for making endless sheets of composite mica having, in combination, a long endless conveyer, means for depositing an assembly of dry mica flakes thereon, a short endless covering apron located intermediate the ends of the conveyor, driving mechanism for the conveyer including sprockets at each side thereof, driving mechanism for the apron including sprockets of the same size at each side thereof, said driving mechanism including also a single sprocket chain for engaging all the sprockets at one side and a single sprocket chain for engaging all the sprockets at the other side, and power means for driving one set of sprockets, whereby the conveyer and apron advance at the same rate of speed.

In testimony whereof I affix my signature.

HENRY W. COOPER.